W. BEACH.

Curry Comb.

No. 161. Reissued Feb. 12, 1850.

N. PETERS, Photo-Lithographer, Washington, D. C.

UNITED STATES PATENT OFFICE.

WILLIAM BEACH, OF PHILADELPHIA, PENNSYLVANIA.

IMPROVEMENT IN CURRY-COMBS.

Specification forming part of Letters Patent No. 6,181, dated March 1`, 1849; Reissue No. 161, dated February 12, 1850.

*To all whom it may concern:*

Be it known that I, WILLIAM BEACH, of the city of Philadelphia, in the county of Philadelphia and State of Pennsylvania, have invented an Improved Curry-Comb; and I do hereby declare that the following is a full, clear, and exact description of the same, and of the manner of making and using the same, reference being had to the accompanying drawings, which form a part of this specification.

Figure 1:
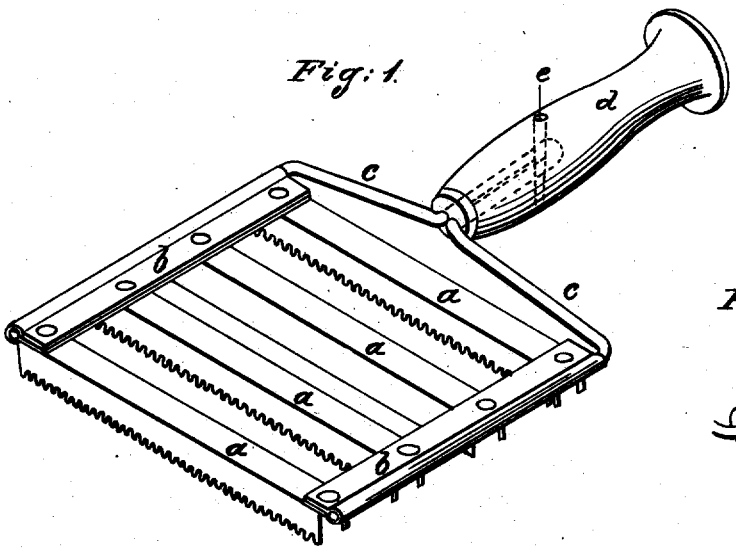
Figure 2:
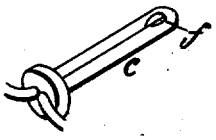

Figure 1 is a general view of the comb, *a a a a* being trough-shaped bars on which the teeth are cut, and which are set apart from each other, leaving spaces open between them for the escape of dirt. Fig. 2 shows that part of the shank that enters the handle.

The construction is as follows: The teeth of the comb are cut on the edges of bent pieces of metal *a a a a*, as has been long practiced; but these pieces of metal, instead of being fastened to a flat continuous piece of metal to form the back of the comb, are set apart and parallel to each other, their ends only being attached, by riveting, to folded strips of metal *b b*. Each of these strips of metal *b* is made double, and at the bend or along the fold is formed a cavity to receive a wire, *c*, running through them. The same piece of wire by its two opposite ends passes through both of the bars *b b*. This wire *c* is bent in its middle into a loop, the two parts of which, after forming a loop, *f*, just beyond the bend, are brought together, as shown in Fig. 2, to a sufficient distance to form a shank to enter the handle *d*, which is of wood and made in the ordinary way, after which the two parts of the wire are separated and extended out to the width of the comb. They are then turned at right angles and pass through the bends or folds in the strips *b b*, above described, which secures the shank to the comb, leaving the whole length and breadth of the comb, with its spaces between the troughs, unobstructed for the free escape of dust.

The advantages arising from the above mode of constructing my comb are that while the back of the comb is left open for the discharge of dust, the double side strips, *b*, including the wire connecting them with the handle, form stout ribs, that supply the place of ordinary knockers, by which whatever dust may lodge in the troughs is readily knocked out. The shank is affixed to the handle by a pin, *e*, passing down through the wooden handle and the opening *f* in the bight of the wire-loop. The advantage of this mode of fastening is that the mode of making the shank involves neither welding nor drilling. The triangular form into which the shank is bent between the handle and comb acts as a brace, and also elevates the handle above the comb, whereby the hand in using this comb is kept away from the body of the animal curried.

Having thus fully described my invention, what I claim as new, and desire to secure by Letters Patent, is—

1. Combining the trough-shaped bars *a*, which have the comb-teeth on their edges, with the folded strips of metal *b* and with the wires *c*, running through them, in the manner substantially as herein set forth, so as to form a curry-comb with open or hollow back. I do not claim separately either trough-shaped comb-bars or combs with open backs, but only in the combination herein set forth.

2. The shank constructed with the fastening-hole therein made without drilling or welding and combined with the comb, as herein above described, so as to act as guards to the ends thereof.

WILLIAM BEACH.

Witnesses:
CHARLES SACRISTE,
SAMUEL K. DINSMAR.